United States Patent [19]

Alvi et al.

[11] Patent Number: 5,319,176
[45] Date of Patent: Jun. 7, 1994

[54] PLASMA ARC DECOMPOSITION OF HAZARDOUS WASTES INTO VITRIFIED SOLIDS AND NON-HAZARDOUS GASSES

[75] Inventors: Obaid U. Alvi, Richardson; Irfan A. Toor, Plano, both of Tex.

[73] Assignee: Ritchie G. Studer

[21] Appl. No.: 645,127

[22] Filed: Jan. 24, 1991

[51] Int. Cl.$^5$ .............................................. B23K 9/00
[52] U.S. Cl. ......................... 219/121.59; 219/121.36; 219/121.37; 219/121.48; 219/121.49; 373/18; 110/242; 110/236; 110/250
[58] Field of Search ................... 219/121.36, 121.37, 219/121.38, 121.48, 121.43, 121.59, 121.49; 373/18-22; 110/235-240, 250, 256

[56] References Cited

U.S. PATENT DOCUMENTS

| | | | |
|---|---|---|---|
| 4,479,443 | 10/1984 | Faldt et al. | 110/235 |
| 4,759,300 | 7/1988 | Hansen et al. | 110/238 |
| 4,819,571 | 4/1989 | Hallett | 110/237 |
| 4,901,654 | 2/1990 | Albertson et al. | 110/238 |
| 4,909,164 | 3/1990 | Shohet et al. | 110/250 |
| 4,989,522 | 2/1991 | Cline et al. | 110/238 |

Primary Examiner—Mark H. Paschall
Attorney, Agent, or Firm—Fish & Richardson

[57] ABSTRACT

For disposal of waste material including water, volatile components and vitrifiable components, the waste material is heated in a dehydrator to remove the water, heated in a high-temperature dryer to vaporize hydrocarbon liquids, and then fed to the focus point of a primary plasma reactor where plasma arc jets are focused on the surface of a pool of the vitrifiable components. At the focus point the vitrifiable components are melted, and the volatile components are volatized. The melted vitrifiable components are received in a quench chamber where they solidify on a quench roller and are broken into chips and delivered to a receiving area. Heat from the quench chamber is transferred to the dehydrator and high-temperature dryer. The hydrocarbon liquids and volatized components are fed to a secondary plasma reactor where they are disassociated into their elemental components. The effluent from the secondary plasma reactor is scrubbed to remove hydrogen sulfide and halogens, and residual components, together with excess water vapor, are extracted in an absorber and fed back for further processing in the secondary plasma reactor.

27 Claims, 9 Drawing Sheets

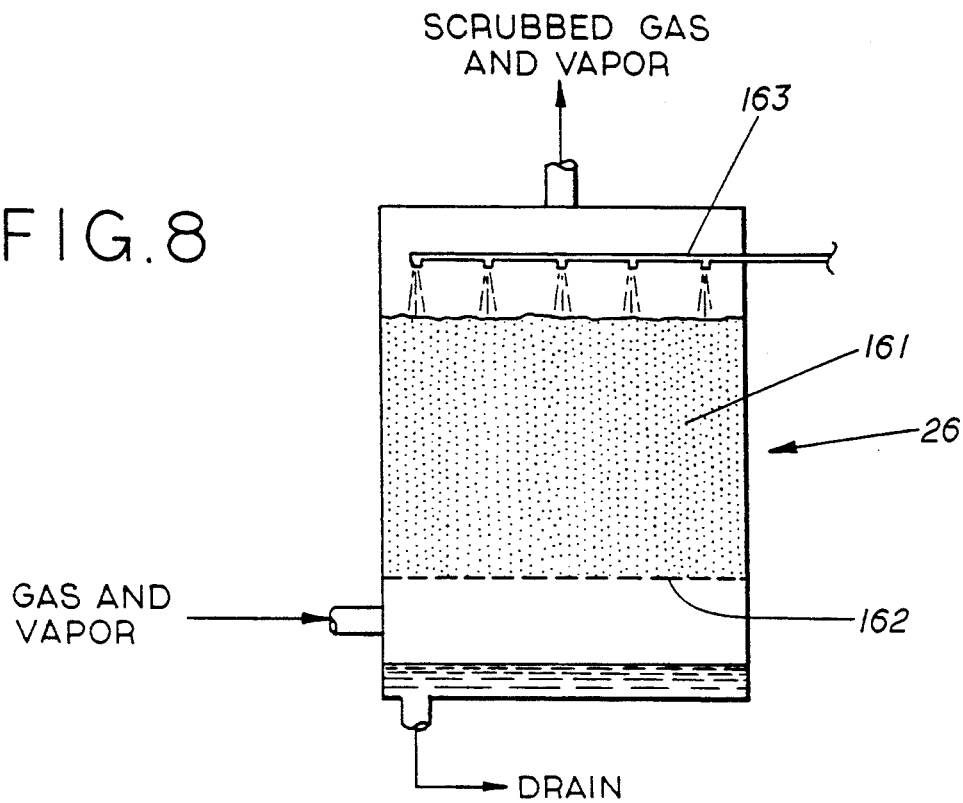
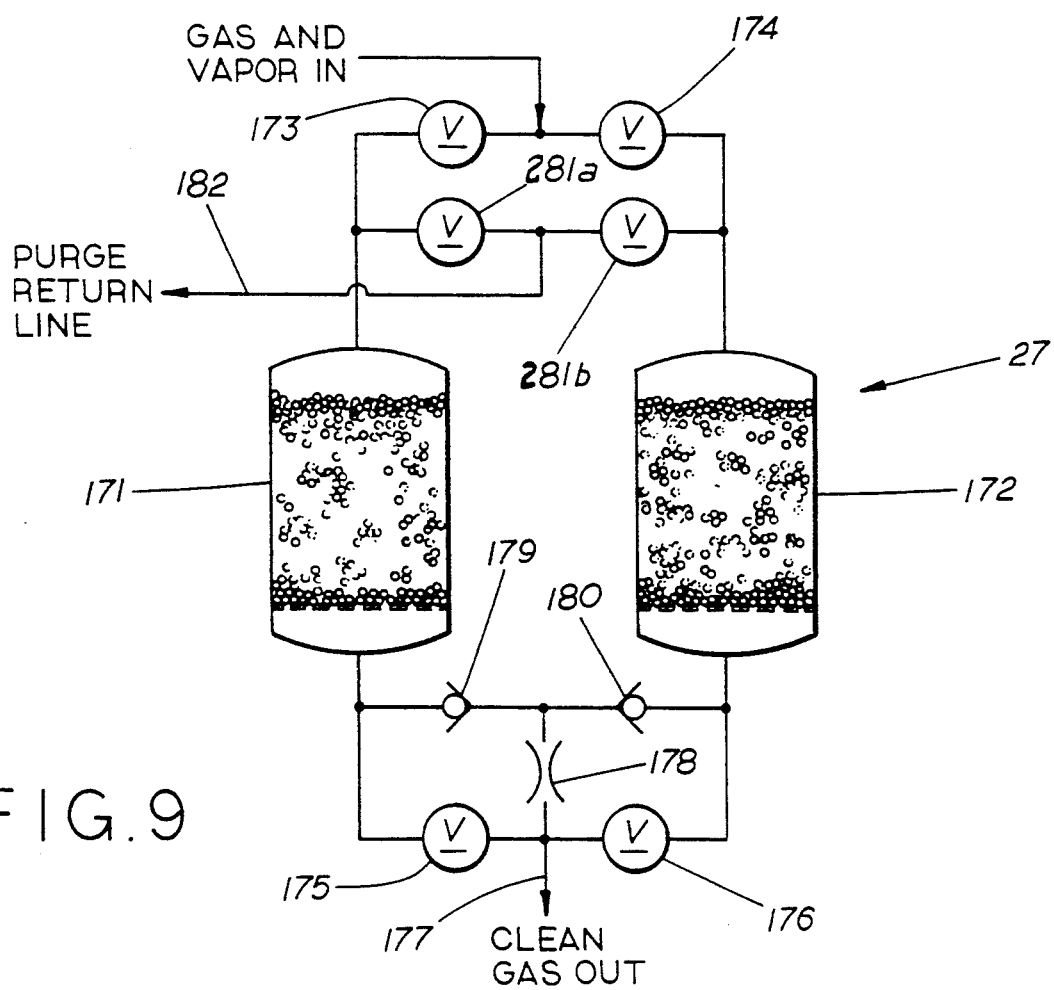

PLASMA ARC DECOMPOSITION OF HAZARDOUS WASTES INTO VITRIFIED SOLIDS AND NON-HAZARDOUS GASSES

BACKGROUND OF THE INVENTION

1. Technical Field

The present invention relates generally to the disposal of hazardous waste that includes both vitrifiable and volatile components. Specifically, the present invention relates to the decomposition of such waste by the application of an extremely high temperature plasma arc such as the flame of a plasma torch.

2. Background Art

One known method of decomposing hazardous waste is thermal free radical pyrolysis. Hazardous waste materials such as PCB's and dioxin are disassociated into their elemental constituents when subjected to high temperatures such as temperatures in excess of 10,000° F. provided by a plasma arc. Upon cooling under controlled conditions, the elemental constituents will recombine into elemental forms and simple, non-hazardous compounds.

In many cases the pyrolysis of hazardous waste materials is complicated by the presence of a vitrifiable solid component such as silica. Although gasses and vapor are readily disassociated into their elemental constituents when passed through the gap between the electrodes of a non-transferred plasma torch, the vitrifiable solids such as silica, aside from being highly abrasive, tend to melt and clump together, forming an insulating coating on the electrode surfaces. Therefore it is impractical to process the vitrifiable component by passing it through the gap between electrodes of a non-transferred plasma torch.

The next best alternative is to heat the vitrifiable component in a large crucible or basket with a transferred plasma arc or a gaseous plasma arc jet of a non-transferred plasma torch. The crucible or basket is generally lined with a refractory material. Nevertheless, care must be exercised to avoid the destruction of the refractory lining by erosion from the super high temperatures of the plasma arc jet. This problem has been addressed by rotating the support so that the plasma arc jet is not focused upon the same location of the support for an undue length of time. Unfortunately this method of avoiding erosion of the support leads to excessive heat loss from areas of the melt not in direct contact with the flame at any given time. The problem is further multiplied when the crucible size is increased in an effort to increase the batch size because the plasma jet flame is only a few square inches while the area of a large crucible may be several thousand square inches.

A further problem is introduced by the nature of the melt thus formed. The melt is extremely viscous and may solidify into a glass-like material upon slight cooling. In the solid state the thermal conductivity of the material is very low and further cooling may be extremely slow. Thus, handling and continuous removal of the material is a difficult problem.

Batch processing has been accomplished by pouring the melt into a slag bucket. Not only is this method limited in throughput capability, but also all of the heat content of the melt is lost, rendering the process, extremely uneconomical. Moreover, a significant amount of the melt remains in the crucible and does not drain, which further reduces the batch size.

SUMMARY OF THE INVENTION

In accordance with one aspect of the present invention, waste material including volatile and vitrifiable components is processed by a plasma arc jet. The plasma arc jet melts a localized surface region on a pool of the vitrifiable component to produce a relatively small and localized melted surface region. A stream of the waste material is preheated and introduced directly and completely into the melted localized surface region. This saves considerable energy during the start-up of the waste processing, because it is not necessary to melt a large portion of the pool to begin processing the waste material.

In accordance with another aspect of the present invention, the vitrified component of processed waste is received and solidified on a quench roller, broken into chips and delivered to a receiving area. Continuous processing in this fashion results in high throughput and more economical processing through heat recovery.

In accordance with yet another aspect of the present invention, a multi-step process is used for processing waste material including moisture and hydrocarbons, which are volatile components, and a vitrifiable component such as fine soil. The waste material is heated in a dehydrator to remove most of the moisture, and then fed to a high temperature dryer where most of the hydrocarbons are volatized. The dry solids are then further heated in a preheater to a point just below their melting point, and then fed to a reactor where the vitrifiable component of the dry solids is melted. The melted vitrifiable component is received in a quench chamber where it is cooled and solidified. Heat from the melt is recovered in the quench chamber and is transferred to the dehydrator and dryer for heating the in-coming stream of waste material.

In accordance with still another aspect of the invention, waste material including volatile and vitrifiable components is heated in a plurality of heating states to separate the volatile components from the vitrifiable components. The volatile component is fed to a plasma reactor where it is disassociated into elemental components. This multi-step process is more effective in reducing the volatile component into non-hazardous molecules. The concentration of residual hazardous components from the effluent of the plasma reactor may be further reduced by scrubbing, or in the case of residual components that may be further broken down by pyrolysis, by removing the residual components from the effluent and feeding them back to the plasma reactor. In addition, heat from the effluent of the plasma reactor may be recovered and transferred to the heating stages.

In accordance with a further aspect of the invention, combustion of hydrocarbons provides additional heat for preheating the feed of waste material to the plasma arc jet and the plasma reactor. Preferably the hydrocarbons are obtained by processing the volatile component of the waste material. When an insufficient amount of hydrocarbons is recovered from the waste material, the deficiency is made up by the combustion of conventional hydrocarbon fuels such as natural gas or propane. By preheating the feed of waste material to the plasma arc jet and the plasma reactor, it is possible to substantially reduce the required electrical power and increase throughput. Electrical energy is expensive, and rather bulky and heavy generators are needed to supply megawatts of power required by the plasma arc jet and the plasma reactor for achieving reasonable throughput.

The plasma arc jet and the plasma reactor are important for achieving high temperatures required for essential chemical reactions that break down hazardous components of the waste material. Since more heat is required to pre-heat the cold incoming stream of waste material, it is more efficient to use hydrocarbon fuels to vaporize water at low temperatures and preheat waste material before it is introduced into the plasma arc jet and the plasma reactor.

In accordance with a final aspect of the invention, steam released in the dehydrator is used as plasma gas in the plasma arc jet and in the plasma reactor. As a plasma gas, steam is an instant source of both oxygen and hydrogen which are important for promoting desirable reactions. Oxygen stabilizes heavy metal in the melt, and while in the gas phase both oxygen and hydrogen are important for promoting the formation of methane and carbon monoxide, and suppressing the formation of coke. The use of steam as a plasma gas also minimizes the formation of oxides of nitrogen ($NO_x$s) by keeping air and nitrogen out of the system.

BRIEF DESCRIPTION OF THE DRAWINGS

Other objects and advantages of the invention will become apparent upon reading the following detailed description and upon reference to the drawings in which:

FIG. 8 is a schematic diagram of a scrubber used in the waste processing system of FIG. 1 for removing chemically active species such as hydrogen sulfide and halogens;

FIG. 9 is a schematic diagram of a pressure swing absorber used for removing water vapor and high molecular weight hydrocarbons that pass through the secondary plasma reactor;

Figure 1:
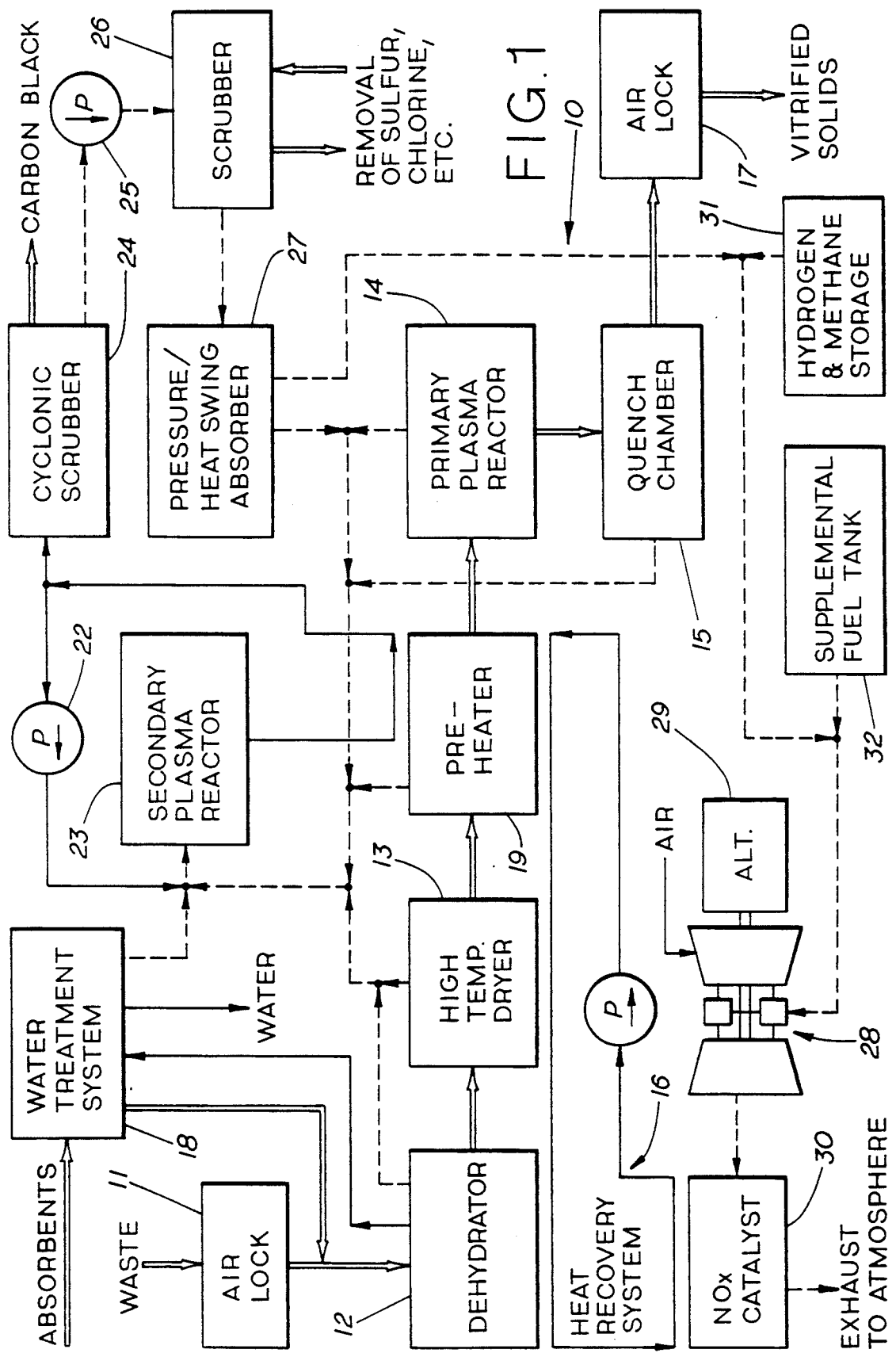
FIG. 1 is a block diagram of a solid waste processing system incorporating the present invention.

While the invention is susceptable to various modifications and alternative forms, a specific embodiment thereof has been shown by way of example in the drawings and will herein be described in detail. It should be understood, however, that it is not intended to limit the invention to the particular form disclosed, but on the contrary, the intention is cover all modifications, equivalents, and alternatives falling within the spirit and scope of the invention as defined by the appended claims.

DESCRIPTION OF THE PREFERRED EMBODIMENT

Turning now to FIG. 1, there is shown a preferred embodiment of a waste processing system 10 incorporating the present invention. The system 10 is based primarily upon the principle of pyrolytic decomposition in which hazardous compounds are subjected to intense heat in an oxygen-depleted atmosphere. In the present invention, this principle is applied to the processing of waste including volatile and vitrifiable components, but the waste is first heated to separate the volatile components from the vitrifiable components. Each of the separate volatile and vitrifiable component streams is subjected to super-high temperatures of a respective plasma flame in an air-depleted atmosphere. This causes the volatile components to break down into elemental constituents which recombine into simple, non-hazardous molecular forms, and causes the vitrifiable components to be vitrified into a stable non-hazardous material.

To keep air out of the system 10, the waste is introduced into the system via an air lock 11. This also ensures that the products of the pyrolytic decomposition are discharged to the atmosphere only after the removal of harmful components.

One of the factors responsible for the high cost of disposing of hazardous solid waste is the energy that has been required for the disposal process. Although solid waste such as oil refinery sludge has a high content of combustible components which may provide a source of energy, the processing of such waste has been very energy inefficient due to a failure to recover energy released in exothermic processing steps and use the recovered energy in endothermic processing steps. A detailed heat balance study, for example, shows that for oil refinery sludge, substantially more heat is required for thermal dehydration of the sludge and preheating the vitrifiable components than for the melting process itself. Refinery sludge, for example, typically has at least twenty per cent moisture, and possibly up to fifty per cent. If this moisture is eliminated by heating, a great deal of heat is required.

For a moisture content in excess of twenty per cent, a substantial amount of water can be economically removed from solid waste without the application of heat so long as the particle size of the waste is sufficiently large. Mechanical presses and filters can remove water from solid waste having small particle sizes, but with limited throughput, and even then there is a substantial fraction of residual moisture. For solid waste having large particle sizes, a Laughlin continuous centrifuge would be very attractive for water removal. The Laughlin continuous centrifuge, for example, is described in Badger & McCabe, *Elements of Chemical Engineering*, 2ed., McGraw-Hill Book Company, 1936, p. 506, incorporated herein by reference. Unfortunately, oil refinery sludge has very small particle sizes in the range of a few microns, which makes mechanical presses, filters and centrifuges impractical.

The waste processing system 10 of FIG. 1 includes a dehydrator 12 that removes water from the waste. Depending on the particle size of the waste, the dehydrator may include a dewatering mechanism for removal of water without the application of heat, followed by a low temperature dryer (250°-300° F.) that removes water from the waste by the application of heat. As further described below in connection with FIG. 2, however, the preferred embodiment of the invention does not use a dewatering mechanism, because the preferred embodiment is intended for processing oil refinery sludge having very small particle sizes.

The dehydrated waste is fed to a high temperature dryer 13 (800°–1000° F.) which volatizes hydrocarbons such as oil residue, and a preheater 19 in which the solids are further heated to a temperature close to their melting point, for example a few hundred degrees Fahrenheit below their melting point. The solids typically include primarily silica, a vitrifiable component that melts at about 2300° F.

The hot vitrifiable waste is then fed to a primary plasma reactor where the waste is melted. Any residual gasses released during the melting process are collected and transferred to a secondary plasma reactor 23, as described below. The melted component is received and solidified in a quench chamber 15. A heat recovery system generally designated 16 receives heat from the quench chamber 15 and heat from the walls of the primary plasma reactor 14, and feeds the heat back to the high temperature dryer 13 and the dehydrator 12. Vitrified solids are removed from the quench chamber 15 and passed through an air lock 17 for disposal.

The dehydrator 12 may generate waste water laden with hydrocarbon liquids and dissolved gasses. The waste water can be recycled back to a water treatment system 18, which could be the water treatment system of the waste generating industry. The water treatment system 18, for example, has a series of tanks (not shown) for sedimentation and the removal of hydrocarbons and other contaminants using absorbents such as activated carbon. For further details regarding the construction of a suitable water treatment system, one may refer to Mallatt et al., U.S. Pat. No. 4,168,228 issued Sep. 18, 1979, incorporated herein by reference.

The dehydrator 12 generates steam mixed with light hydrocarbon vapors. A significant part of this mixture can be used as plasma gas in the primary and secondary plasma reactors. Any excess water vapor is condensed and returned to the water treatment system 18. Depending on the composition of the vapor generated in the dehydrator, it may be desirable to distill the vapor to separate the light hydrocarbons from the excess water vapor before the excess water vapor is condensed and returned to the water treatment system. The hydrocarbon rich fraction is directed to the secondary plasma reactor 23 for pyrolytic destruction. Hydrocarbon vapor from the high-temperature dryer 13 is also fed to the secondary plasma reactor 23 together with vapor and gasses from the preheater 19, primary plasma reactor 14, and quench chamber 15.

In the secondary plasma reactor 23, the hydrocarbons and other hazardous components are subjected to extremely high temperatures and break down into their elemental constituents. These elemental constituents recombine under controlled conditions to form simple, non-hazardous molecules. The composition of the final products is controlled by the residence time distribution inside the secondary plasma reactor 23, the temperature distribution in the reactor, and the quenching of the effluent. Preferably the conditions are controlled to promote the formation of hydrogen, carbon monoxide and methane, and inhibit the formation of coke and carbon black. Under these conditions, however, the effluent will also contain carbon monoxide, and lesser amounts of carbon black, carbon dioxide, and water vapor, and possibly some hydrogen sulfide and halogens, depending on the initial composition of the hazardous waste being processed.

The effluent from the secondary plasma reactor contains a good deal of heat due to the extremely high temperatures in the reactor. Some of this heat is recovered and used for heating the dehydrated solid waste in the preheater 19, as further described below with reference to FIG. 2.

Under some conditions coke or charring might tend to form on inlet pipes feeding the hydrocarbon vapor to the secondary plasma reactor 23. In this case, the charring might be prevented by recycling some of the effluent from the secondary plasma reactor back to the inlet pipes for example, by a circulation pump 22 such as a Roots pump.

Any solids in the effluent, such as carbon black, are removed in a cyclonic scrubber 24. The effluent from the cyclonic scrubber 24 is a combustible gas, which may be incinerated to heat the dehydrator 12 and high temperature dryer 13, or delivered to an engine such as a gas turbine 28 for generating electrical power to power the waste processing system 10. For this purpose, the effluent from the cyclonic scrubber is compressed by a pump 25 and stored in a storage tank 31. Depending on the initial composition of the hazardous waste being processed, however, the effluent from the cyclonic scrubber should be further purified before it is incinerated. The higher pressure from the pump 25 facilitates additional purification in one or more scrubbers 26 or absorbers 27.

The scrubber 26 removes undesirable gases such as hydrogen sulfide and halogens such as chlorine. For processing refinery waste, for example, a good deal of hydrogen sulfide will be generated. The hydrogen sulfide is removed, for example, by an "iron sponge" including iron oxide on a carrier such as wood shavings or ceramic beads. Halogens, for example in the form of hydrogen chloride gas, are readily scrubbed using an alkaline solution.

The effluent from the scrubber 26 may still have undesirable levels of hazardous gases and excessive water vapor. The water vapor and hazardous gases are removed in a pressure and/or heat swing absorber 27 and fed back to the secondary plasma reactor 23. The clean effluent is used to power the gas turbine 28 that drives an alternator 29 to supply electrical power to the waste processing system 10. Waste heat from the turbine 28 is picked up by the heat recovery system 16 and used to heat the high-temperature dryer 13 and the dehydrator 12. Depending on the upon the hydrocarbon content of the waste being processed, or during system start-up, the turbine 28 may require fuel from a supplemental fuel tank 32. On the other hand, the waste being processed may contain more hydrocarbon than is required to provide heat and power to the system 10. In this case, additional pressure and/or heat swing absorbers could be used for separating the clean and dry gas into separate gas components such as carbon dioxide, methane and hydrogen, which could be used for commercial or industrial purposes.

Figure 2:
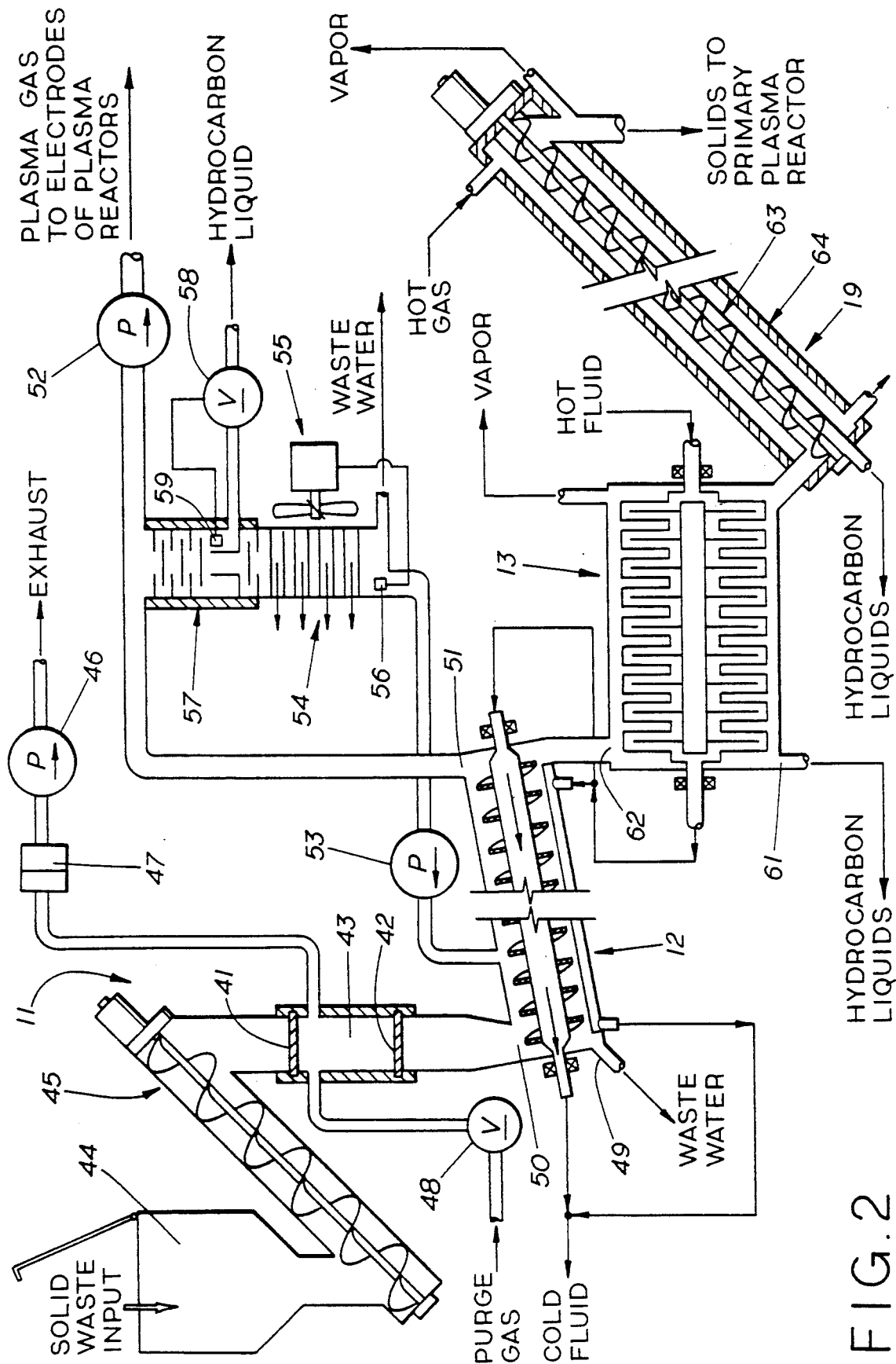
FIG. 2 is a schematic diagram of an air lock, dehydrator, hydrocarbon vaporizer, and preheater used in the system of FIG. 1.

Turning now to FIG. 2, there is shown a schematic diagram of the air lock 11, dehydrator 12, high temperature dryer 13, and preheater 19. The air lock 11, for example, is provided by a series of gate valves 41 and 42 defining an intermediate chamber 43 between a feed hopper 44 and the dehydrator 12. To maintain an air lock condition, at most one of the gate valves 41 and 42 is open at any given time.

In operation, solid waste is received in the feed hopper 44. A screw feeder 45 periodically transfers solid waste from the feed hopper 44 to the intermediate chamber 43 of the air lock. At the beginning of a transfer cycle, the lower gate valve 42 is in a closed state and the upper gate valve 41 is opened. The screw feeder 45 is activated to fill the intermediate chamber 43 with solid waste from the hopper 44. After a predetermined time just sufficient to almost fill the intermediate chamber 43, the screw feeder 45 is stopped, and then the upper gate valve 41 is closed. The intermediate chamber 43 is then evacuated by a vacuum pump 46 connected to the intermediate chamber through a filter 47. To ensure even more complete removal of air from the intermediate chamber, a purge valve 48 can be opened to back-fill the evacuated chamber with a purge gas such as argon or carbon dioxide, and evacuated again by the vacuum pump 46. This purge cycle can be repeated to further reduce the concentration of residual air in the intermediate chamber. Then the lower gate valve is opened to discharge the air-free material into the dehydrator 12.

The dehydrator 12 may include a water separator followed by a low temperature dryer, as discussed above. The dehydrator 12 and the high temperature dryer 13 may be two independent dryers or two stages of a continuous feed dryer such as a heated screw conveyor dryer or heated disc conveyor dryer. As shown in FIG. 2, the dehydrator 12 is a heated screw conveyor dryer, and the high temperature dryer 13 is a heated disc conveyor dryer. These kinds of dryers are manufactured and sold by Bepex corporation, Three Crossroads of Commerce, Rolling Meadows, Ill. 60008. Heat transfer fluid is circulated through the inside of the conveyor screw and discs and/or dryer jacket as shown.

The heated screw conveyor is preferred for the dehydrator 12 because it can elevate the waste material as it is dried, and condensation will collect in a sump 49 below the feed port 50 so as to reduce the duty on the dryer and help separate water from hydrocarbons in the waste material. The condensation in the sump is primarily waste water, and it is drained to the water treatment system (18 in FIG. 1).

The heated disc conveyor is preferred for the high-temperature dryer 13 because the heated disc conveyor tends to mix and homogenize the dehydrated waste material. It is slightly inclined so that hydrocarbon vapors condensing in the dryer 13 will collect in a sump 61 below the feed port 62 of the dryer. Hydrocarbon liquid from the sump is injected into the secondary plasma reactor 23, as further described below with respect to FIG. 6.

To avoid the formation of coke in plasma reactors (14 and 23 in FIG. 1), it is desirable to maintain a certain concentration of water vapor in the plasma reactors. Preferably water vapor from the hot end 51 of the dehydrator is injected into the plasma reactors by using it as plasma gas that is fed by a pump 52 to the plasma arc jets in the reactors. For most waste materials to be processed, there will always be enough moisture in the waste to reach the desired concentration of water vapor; otherwise, water or steam can be injected into the system to reach the desired concentration. The desired concentration is indicated, for example, when the pressure and/or heat-swing absorber (27 in FIG. 1) absorbs a predetermined amount of water vapor from the effluent of the secondary plasma reactor (23 in FIG. 1). A capacitance probe is commonly used in such absorbers to measure the water vapor loading on the absorber and automatically control the cycle time of the dryer. When a predetermined cycle time of the absorber is exceeded, it is necessary to remove water vapor from the system.

For removing water vapor from the system, a pump 53 such as a Roots pump is activated to circulate steam from the hot end 51 of the dehydrator 12 to a condenser 54. A fan 55 responsive to a temperature sensor 56 maintains the temperature of the condenser 54 below the boiling point of water. Condensate from the condenser 54 is drained to the water treatment system (18 in FIG. 1).

To achieve a satisfactory rate of dehydration, the dehydrator 12 should be operated at a temperature substantially above the boiling point of water, for example in the range of about 250°–300° F. But operation above the boiling point of water will cause some light hydrocarbons to vaporize along with the moisture in the waste. To prevent these light hydrocarbons from condensing in the condenser 54, a fractionating column 54 is placed above the condenser 55. Hydrocarbon distillate collects in the fractionating column when the temperature of the column exceeds the boiling point of water. Therefore, hydrocarbon liquid is drained from the fractionating column by a valve 58 responsive to a temperature sensor 59 when the temperature sensor senses a temperature exceeding a predetermined temperature that is just above the boiling point of water. The hydrocarbon liquid is injected into the secondary plasma reactor (23 in FIG. 1) as further described below with reference to FIG. 6.

The preheater 19 includes a screw conveyor 63 that receives dehydrated solid waste from the high temperature dryer 13 and conveys the waste to a point above the primary plasma reactor (19 in FIG. 1) as further described below with reference to FIG. 3. To heat the waste as it is transported in the screw conveyor 63, a cylindrical jacket 64 encloses the screw conveyor and conveys hot gas such as the effluent from the secondary plasma reactor (23 in FIG. 1). Heating fluid such as hot gas might also be circulated inside the screw of the screw conveyor 63 as well as the jacket 64.

Figure 3:
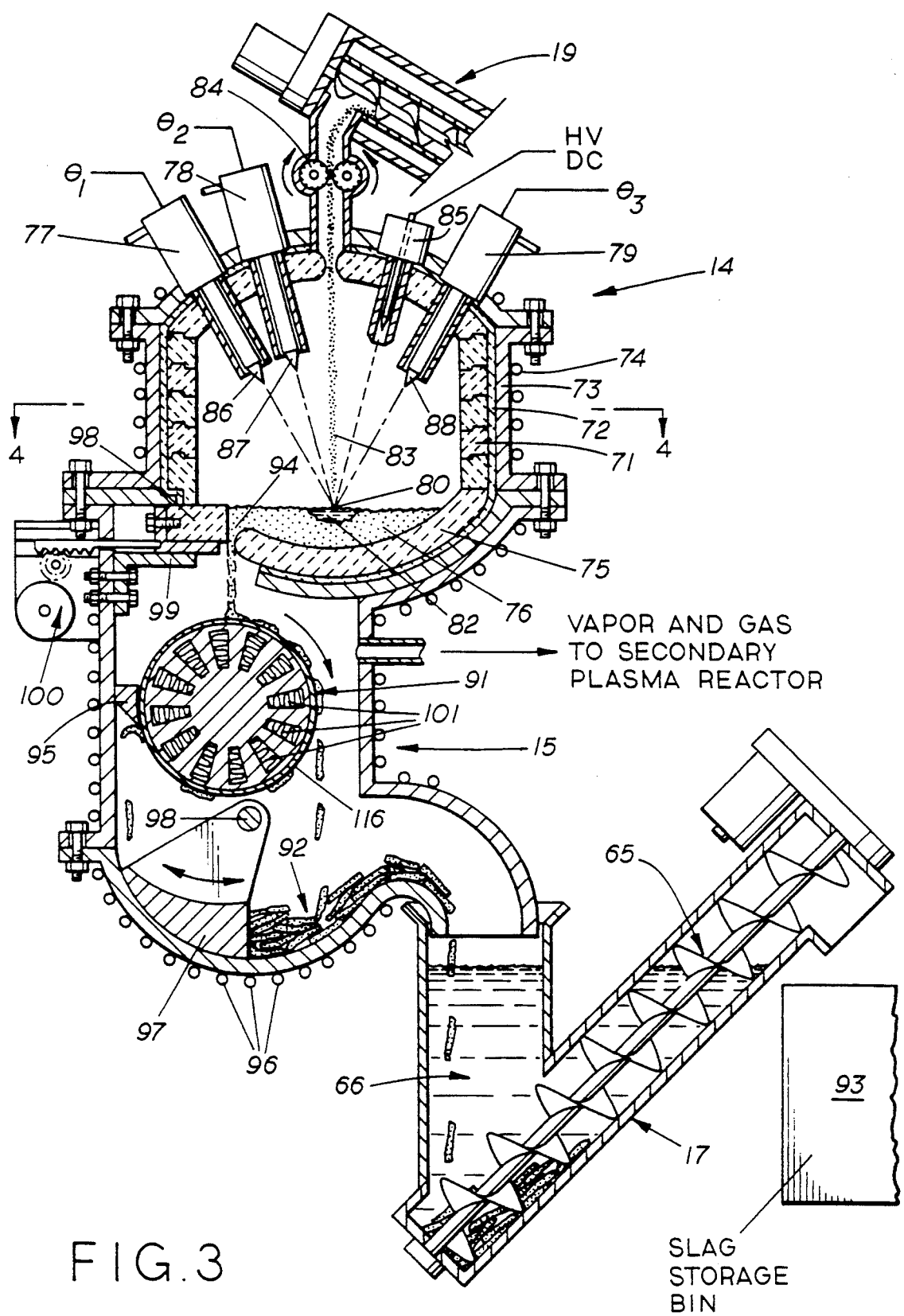
FIG. 3 is a schematic diagram of a primary plasma reactor, quench chamber, and air lock used in the waste processing system of FIG. 1.

Turning now to FIG. 3, there is shown a schematic diagram of the primary plasma reactor 14, the quench chamber 15, and the air lock 17. The primary plasma reactor has a refractory inner wall 71, an intermediate wall 72 of ceramic fiber mat, and an outer steel shell 73. The outer steel shell 73 is cooled by the circulation of heat transfer fluid through cooling coils 74 that are welded or braised to the outer steel shell.

In order to melt the vitrifiable component of the waste, the bottom portion of the primary plasma reactor 14 has a refractory bowl 75 for containing the vitrifiable component of the waste 76 in either a melted or solidified state. During operation of the primary plasma reactor 14, a plasma arc is established on a focus point 80 on the surface of the pool of the vitrifiable component 76 to produce a localized melted surface region 82. A high processing efficiency results by introducing waste material 83 directly and completely into the localized melted surface region 82 because in this case virtually all of the waste material 83 is heated to a very high temperature without requiring a long start-up time to melt the entire pool of the vitrifiable component 76. The waste material 83, for example, is fed by gravity from a shredder or grinder 84 mounted above the top portion of the primary plasma reactor 14.

Plasma torches are available in various configurations. One suitable configuration is shown in FIG. 3. In this example, the plasma arc at the focus point 80 is established by the convergence of plasma jets from a triple-head AC plasma torch having three plasma guns 77, 78, 79 connected to respective phases $\theta_1$, $\theta_2$, $\theta_3$ of a three-phase AC power source (such as the alternator 29 in FIG. 1). For starting the AC plasma torch, a high voltage DC pilot plasma gun 85 generates a pilot plasma jet which ionizes the gas in the region between the electrode tips 86, 87, 88 and the focus point 80 on the pool of vitrifiable component 76. This method of starting-up a three-phase AC plasma torch is described, for example, in Bonet et al., "High Power Plasma Flows," Laboratoire des Ultra-Refractaires-C.N.R.S. B.P.5 (66) Odeillo, France. In this method a flow of gas, such as steam from the dehydrator (12 in FIG. 1), inert gas (such as helium or argon), or hydrogen extracted from the hydrogen and methane storage (31 in FIG. 1), is led along each electrode. The electrodes are made of copper and are water cooled. In addition, the alternating current electrodes 77, 78, 79, preferably include sliding actuators so that the tips of the electrodes can be brought close to the focus point 80 during initiation of the plasma jets by energizing the pilot jet 85. Once current is flowing between the three alternating current electrodes, they can be drawn back to working positions which are shown in FIG. 3.

In accordance with another aspect of the present invention, the melted vitrifiable component of the waste is received and solidified on a quench roller 91, broken into chips 92 and delivered to a receiving area such as a slag storage bin 93. The quench roller 91 is journaled within the quench chamber 15 underneath an opening 94 in the refractory bowl 75. Preferably the opening 94 is in the form of a rectangular discharge funnel defined in part by a sliding gate 98 of refractory material. The use of such a discharge funnel, for example, helps prevent heat and vapor inside the primary plasma reactor 14 from escaping into the quench chamber 15. The discharge of the opening 94 preferably spans the entire length of the quench roller 91 to allow a thin uniform film of melt to form on the entire outer surface of the roller. The position of the sliding gate 98 is adjustable by a linear actuator 100 so that the discharge area of the funnel can be varied to control the flow of melt and also to help in cleaning the funnel at the end of a process run by opening up the funnel.

Any solidified vitrified component that sticks to the quench roller 91 is removed by a scraper 95. The chips 92 fall into an intermediate storage area at the base of the quench chamber 15 where the chips are further cooled by transfer of heat to heat transfer coils 96 of the heat recovery system (16 in FIG. 1). A stoker 97 pivoted on a shaft 98 is used to periodically push the chips out of the bottom portion of the quench chamber and into the air lock 17.

As shown in FIG. 3, the air lock 17 has a so-called inverted water siphon 66 into which the chips fall, and a screw conveyor 66 which raises the chips out of the inverted water siphon and discharges the chips into the slag storage bin 93.

Figure 4:
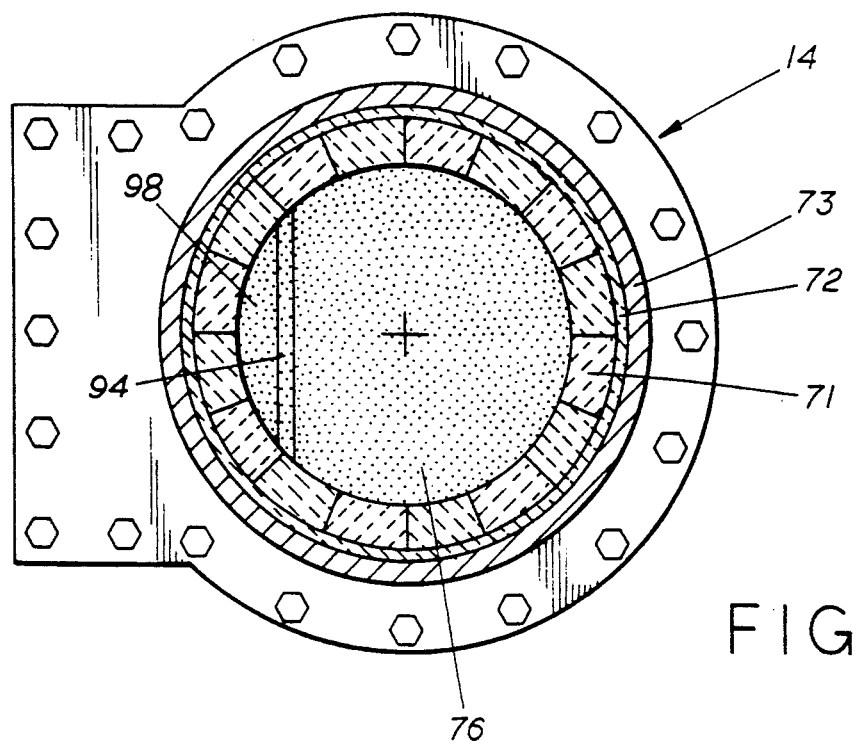
FIG. 4 is a top view and partial section of the primary plasma reactor of FIG. 3.

Turning now to FIG. 4, there is shown a plan sectional view of the primary plasma reactor 14. The opening 94 between the refractory bowl 76 and the sliding refractory gate 98 is elongated along the axis of the quench roller (91 in FIG. 3).

Figure 5:
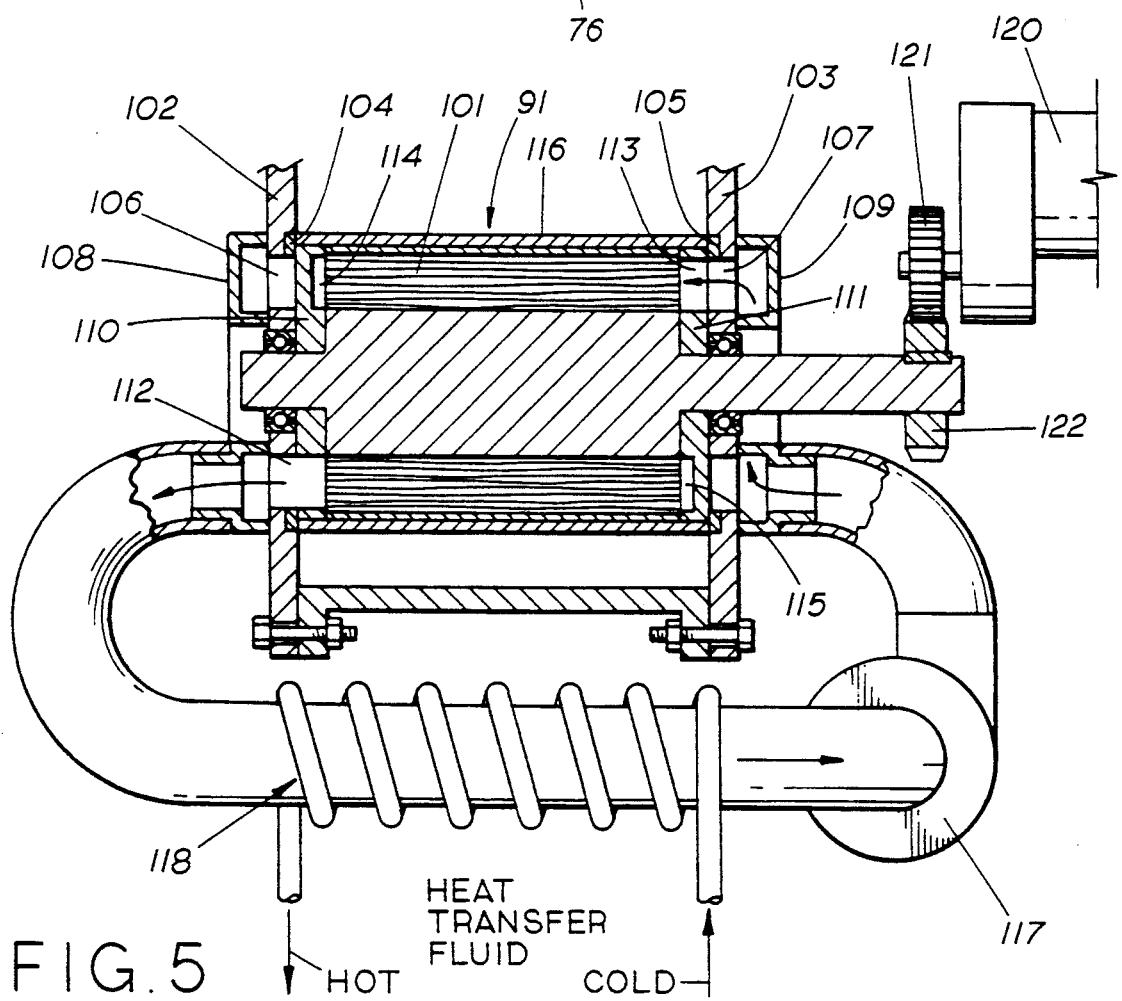
FIG. 5 is a cross-section view along the axis of a quench roller in the quench chamber of FIG. 3.

Turning now to FIG. 5, there is shown a sectional view of the quench roller 91. The quench roller 91 has several hollow sections 101 and is mounted on bearings in walls 102, 103 of the quench chamber 14. The hollow sections 101 are packed with corrugated sheet metal or other packing material to increase the surface area of heat transfer (see also FIG. 4). The walls 102, 103 of the quench chamber are connected to the peripheral end portions of the quench roller 91 through rotary seals 104, 105 made of heat resistant materials, for example, graphite. The walls 102 and 103 also have perforations 106, 107 that permit hot gas to be circulated from the hollow sections 101 inside the roller 91 to circular manifolds 108, 109 mounted on the walls 102, 103. The roller 91 also has end pieces 110, 111 which have perforations 112, 113 aligned with the perforations 106, 107 in the walls 102, 103 to permit the exit and entry of heat transfer fluid such as air. The end pieces also define fluid interconnections 114, 115 for example between neighboring hollow sections 101 which cause multiple passes of the heat transfer fluid along the length of the roller as the roller is free to rotate. The cold fluid may always enter at one end of the roller and hot fluid may always leave the other end for optimum heat transfer. The quench roller 91 is rotated by a motor 120 coupled to the roller by gears 121 and 122.

The quench roller 91 also has a thin outer layer 116 which is made, for example, of high melting point material which has superior resistance to corrosion, for example, stainless steel, Hess alloy or Iconnel.

As shown in FIG. 5, gas is circulated within the quench roller 91 by a blower 117 which blows cool gas into the manifold 109. After the gas is heated within the roller 91, the hot gas is received in the manifold 108. The manifold 108 is coupled through a heat exchanger 118 which transfers heat from the circulating gas to the heat transfer fluid of the heat recovery system (16 in FIG. 1).

Figure 6:
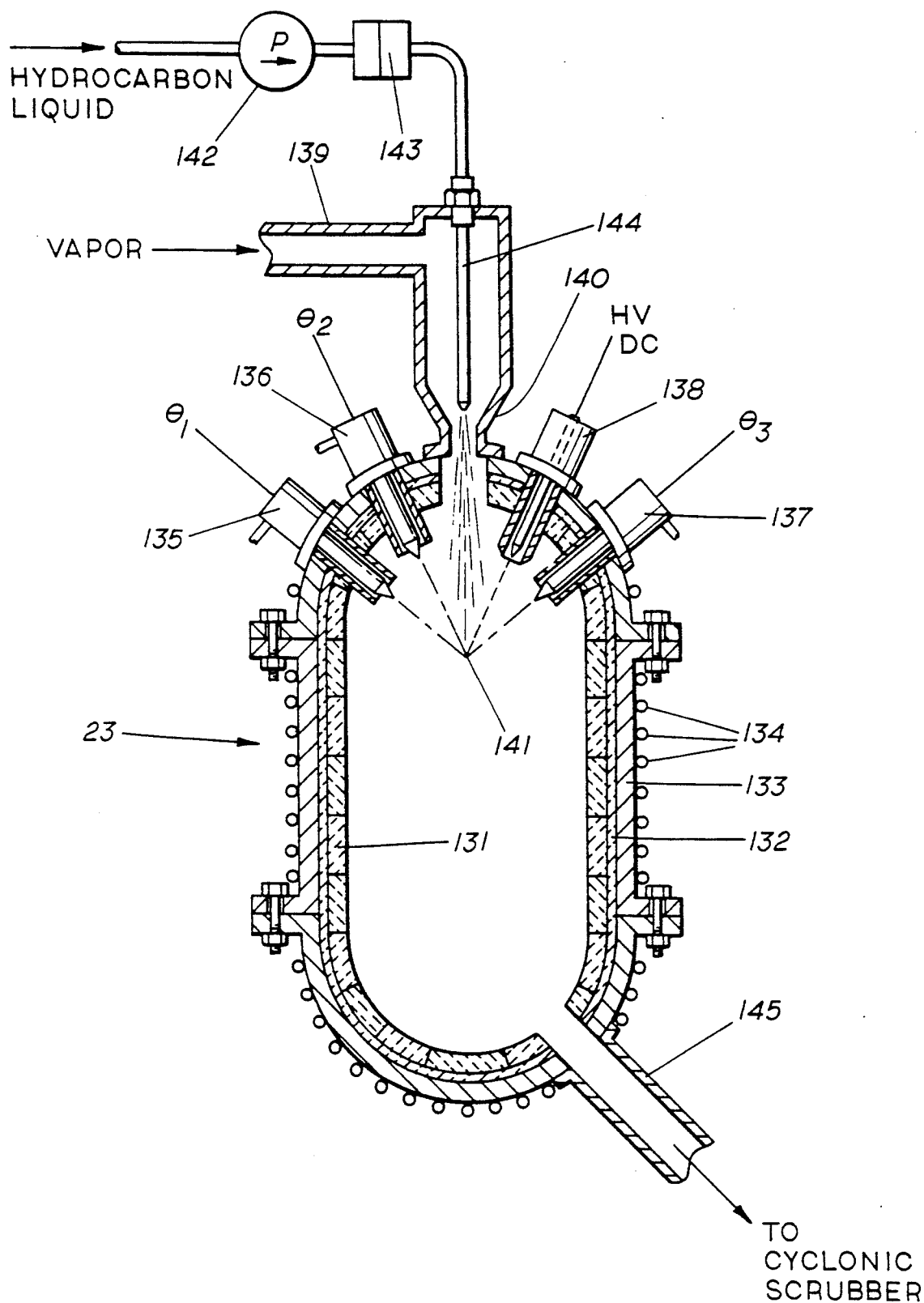
FIG. 6 is a schematic diagram of a secondary plasma reactor used in the waste processing system of FIG. 1.

Turning now to FIG. 6, there is shown a schematic diagram of the secondary plasma reactor 23. The secondary plasma reactor may be a horizontal or vertical tubular reactor. The secondary plasma reactor could use any one of various kinds of electrode configurations, such as coaxial electrodes or multiple plasma jets, and any one of various kinds of flow patterns, such as collinear flow or contraflow of the vapor being treated with respect to the flow of plasma gas from one or more plasma jets. For the example shown in FIG. 6, the secondary plasma reactor 23 has a refractory inner Wall 131, an intermediate wall 132 of ceramic fiber mat, and an outer steel shell 133. The outer steel shell 133 is cooled by the circulation of heat transfer fluid through cooling coils 134 that are welded or braised to the outer steel shell. The secondary plasma reactor 23 also has a plasma torch such as a triple-head AC plasma torch including plasma guns 135, 136 and 137 and a high voltage DC pilot plasma gun 138 which operate in the manner described above with respect to the plasma torch in the primary plasma reactor 23 as shown in FIG. 3.

Hydrocarbon vapor from the high temperature dryer 13, preheater 19, primary plasma reactor 14, quench chamber 15, absorber 27, and water treatment system 18 (see FIG. 1) are received in an inlet pipe 139 to the secondary plasma reactor 23, mixed, and injected by a nozzle 140 at the top of the reactor downwardly toward a focal point 141 of the plasma torch. Hydrocarbon liquid from the high temperature dryer 12 and preheater 19 (see FIG. 1) are pumped by a pump 142 through a filter 143 and injected by a sprayer or atomizer 144 into the stream of vapor flowing to the focus point 141. The hydrocarbon vapor and liquid are broken down by the extreme heat of the plasma torch into their elemental constituents, which recombine to form ga and particulate matter that exits the reactor 23 from an outlet pipe 145.

Figure 7:
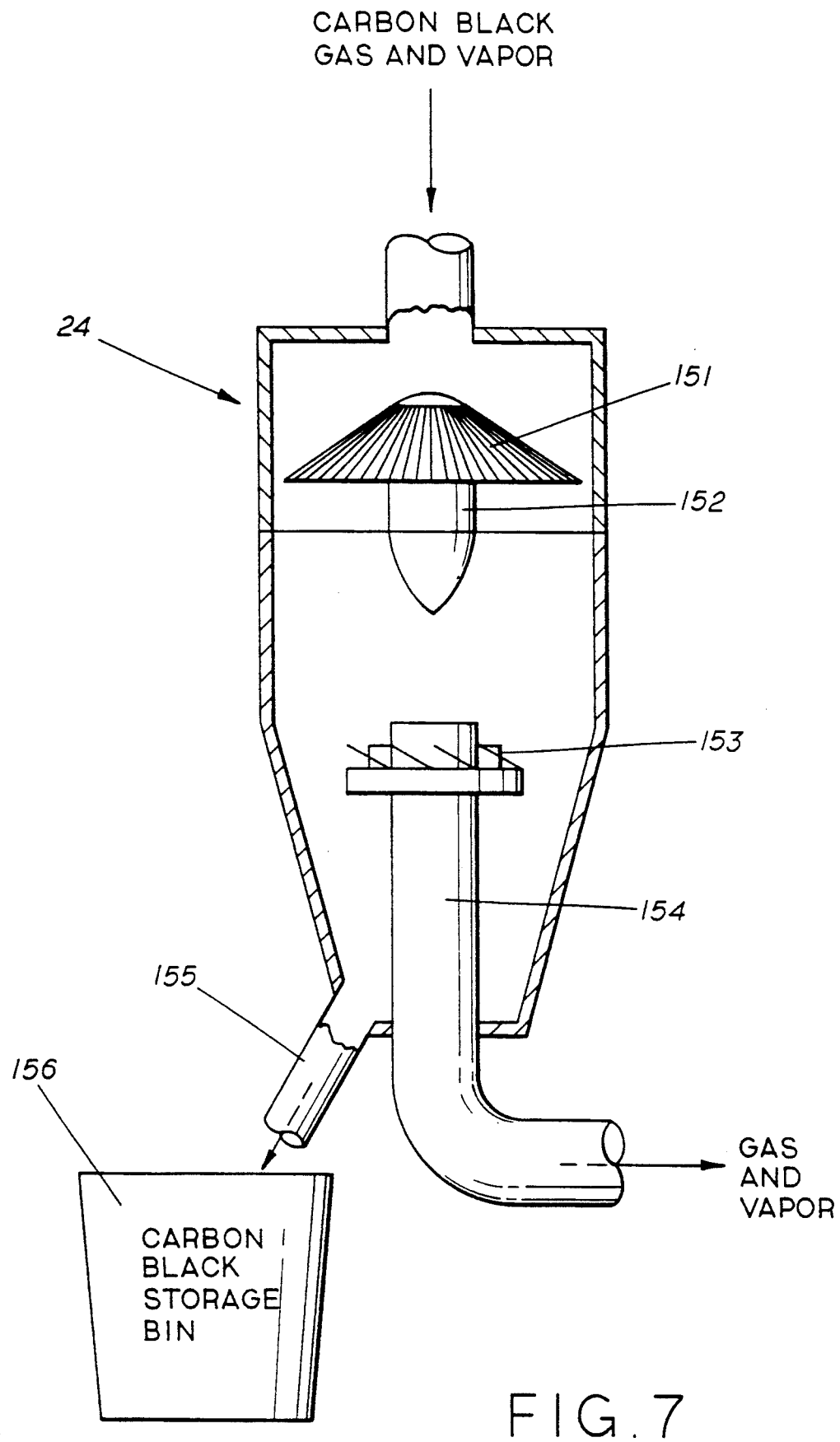
FIG. 7 is a schematic diagram of a cyclonic scrubber used in the waste processing system of FIG. 1 for the removal of particulate matter such a coke or carbon black.

Turning now to FIG. 7, there is shown a schematic diagram of the cyclonic scrubber 24. Various kinds of cyclones could be used. In the example shown in FIG. 7, the cyclonic scrubber 24 includes an impeller 151 driven by a motor 152. The impeller 151 sets up a vortex which interacts with a vortex stabilizer ring 153 so that the vortex terminates on an outlet pipe 154. Carbon black in the gas stream is separated by centrifugal force in the vortex, and precipitates under the force of gravity to a shoot 155 leading to a carbon black storage bin 156.

Turning now to FIG. 8, there is shown a schematic diagram of the scrubber 26. The scrubber includes a bed of material 161 that is supported on a perforated plate and screen assembly 163 and is chemically treated to remove undesirable components of the gas and vapor stream. The material 161, for example, includes iron oxide on a carrier such a wood chips or porous ceramic beads for the removal of hydrogen sulfide. In addition, the bed of material 161 receives liquid from sprayers 163 which activate the bed 161. The liquid from the sprayers 163, for example, is water that moistens the bed. If the waste to be treated includes halogens, the water spray should include alkali chemicals such as sodium hydroxide to remove acid vapor such as hydrogen chloride from the gas stream.

Turning now to FIG. 9, there is shown a schematic diagram of the pressure swing absorber 27. The absorber includes a pair of beds 171, 172 of absorbent such as mircoporous alumina beads or other molecular sieve material. The molecular sieve material has a pore size selected to pass hydrogen and methane but strip water vapor and high molecular weight hydrocarbons from the gas stream. The effluent is directed by a selected one of two inlet valves 173, 174 to one of the beds 171, 172, and a respective one of the two outlet valves 175, 176 is opened to pass effluent from the selected bed to an outlet pipe 177 of the absorber 127. At this time a portion of the effluent is expanded through a restrictor or throttling valve 178 and directed by one of the two one-way valves 179, 180 to back-flow and regenerate the alternate bed and be exhausted as purge gas through a selected one of two purge valves 181a, 281b to a purge line 182. The purge line directs the purged gas and vapor back to a point in the system prior to the secondary plasma reactor 23.

The valves 73, 174, 175, 176, 179, 180, 281a and 281b are periodically switched to have each bed 171, 172 alternately absorb water vapor and undesirable compounds from the gas stream and be purged by a portion of the cleaned gas. The pressure swing absorber 27 shown in FIG. 9 is a commercially available item manufactured and sold, for example, by Pall Pneumatics Corporation of Ocala, Florida. Pressure swing absorbers of the kind shown have been used in combination with scrubbers for the removal of hydrogen sulfide in natural gas treatment. In such treatment systems it is known to direct the purge from the absorber back to the scrubber in a so-called closed system.

Figure 10:
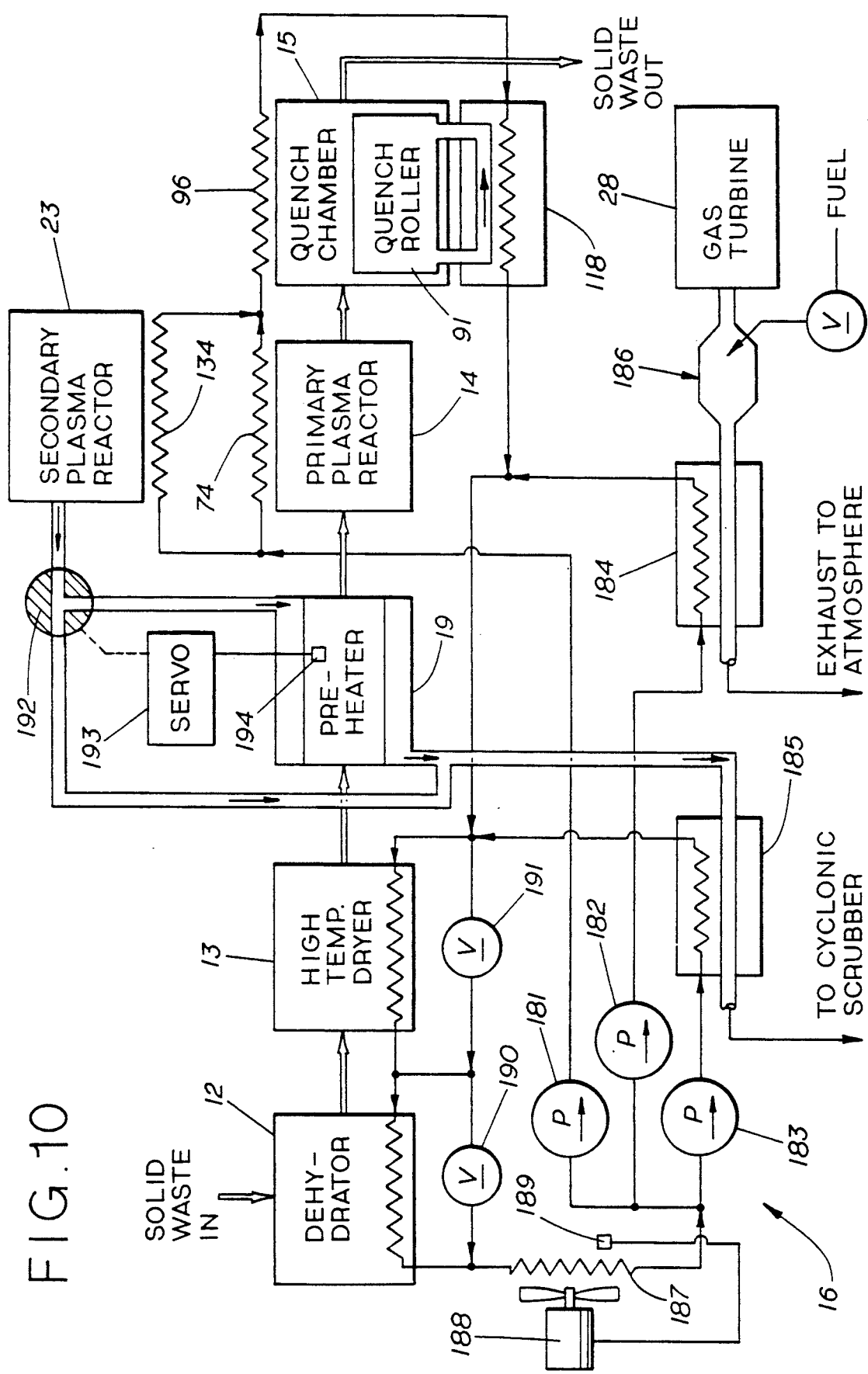
FIG. 10 is a schematic diagram of a heat recovery system for the waste processing system of FIG. 1.

Turning now to FIG. 10, there is shown a schematic diagram of the heat recovery system 16. In this specific embodiment the heat recovery system uses a heat transfer fluid such as silicone oil to transfer heat to the dehydrator 12 and the high temperature dryer 13. The heat transfer system has three pumps 181, 182 and 183 to circulate the fluid to three sources of heat. The pump 181 circulates the fluid to the steel shells of the primary plasma reactor 14, the secondary plasma reactor 14, and the quench chamber 15, and finally the heat exchanger 118 for the quench roller 91. The pump 182 circulates the fluid to a heat exchanger 184 that cools the exhaust of the gas turbine 28. The pump 183 circulates the fluid to a heat exchanger 185 that cools the effluent of the secondary plasma reactor after the effluent pre-heats the solid waste material in the preheater 19. It is desirable to use the separate pumps 181, 182 and 183 because each of the three sources of heat provides heat up to the desired temperature of about 800°-1000° F. for the high temperature dryer, and each source of heat reaches the desired temperature at different times during the start-up of the system. Therefore, the speed of the pumps 181 and 183 can be independently regulated to maintain the desired temperature for the dryer 13 and dehydrator 12 and also provide the desired degree of cooling of the plasma reactors 14, 23, the quench chamber 15, and the effluent of the secondary plasma reactor 23.

Any shortfall in the required amount of heat is indicated by a failure to achieve the desired operating temperature in the dehydrator 12 or in the high temperature dryer 13. In this case, the shortfall is made up by a burner 186 which could burn the combustible ga from the hydrogen and methane storage tank (31 in FIG. 1) or from the supplemental fuel tank (32 in FIG. 1). Any excess in the required amount of heat is eliminated by a radiator 187 and a fan 188 operated by a thermal sensor 189 when a predetermined temperature limit is exceeded. A bypass valve 189 is opened when the temperature of the dehydrator 12 reaches the maximum temperature limit of the dehydrator's desired operating temperature range (250°-300° F). In a similar fashion, a bypass valve 190 is opened when the temperature of the high temperature dryer 13 reaches the maximum temperature limit of the dryer's desired operating range (800°-1000° F). To regulate the temperature of the preheater 192, a mixing valve 192 is adjusted by a servo 193 responsive to a temperature sensor 194.

Figure 11:
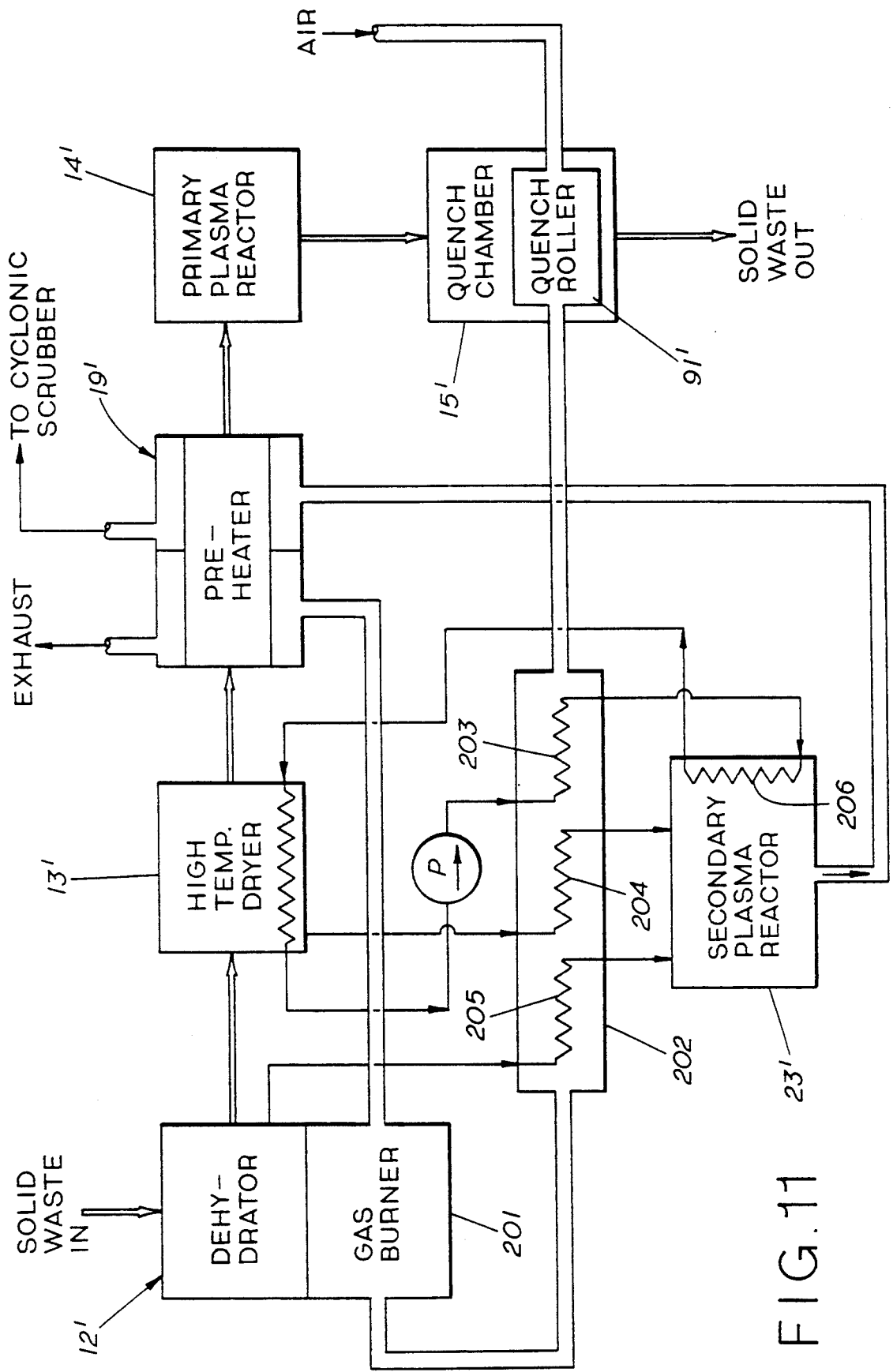
FIG. 11 is a schematic diagram of a heat recovery system for an alternative waste processing system in which a burner provides heat for the dehydrator.

Turning now to FIG. 11, there is shown an alternative heat recovery system that uses a dehydrator 12' having a gas burner 201. In this alternative system a heat transfer fluid is used for providing heat to the high temperature dryer 13', but not the dehydrator 12'. Therefore the temperature of the heat transfer fluid can always be rather high during processing so that more efficient heat transfer fluids such as molten salt can be used.

Some heat from the quench roller 91' is transferred to the dehydrator 12' by preheating the combustion air to the dehydrator. For this purpose air, which may be pre-heated by the steel shells of the primary plasma reactor and quench chamber, flows through the quench roller 91' and then through a heat exchanger 202 on its way to the burner 201. In the heat exchanger 202, the hot air from the quench roller heats the heat transfer fluid from the high temperature dryer flowing in coils 203, hydrocarbon liquid flowing in coils 204 before injection in the secondary plasma reactor 23', and water vapor flowing in coils 205 before injection as plasma gas into the secondary plasma reactor. The effluent of the secondary plasma reactor 23' heat the heat transfer fluid in coils 206. Therefore the temperature of the effluent is limited to the temperature required for pre-heating the solid waste in the preheater 19'. Any shortfall in the temperature of the preheater 19' is made up by directing exhaust from the gas burner 201 to flow to the preheater.

It should be apparent to a person of ordinary skill that the invention is susceptible to many alternatives and modifications. The system of FIG. 1, for example, is readily adapted to processing more or less hazardous wastes having various amounts of water vapor, hydrocarbons, halogens, vitrifiable component, and toxic substances. The system can process semi-solids, liquids, and gasses in addition to solid wastes. The system as shown could be used to process so-called tar sands for synthetic gas production or energy production. Moreover, the gas processing stages could be used for safe destruction of hazardous liquid or gaseous wastes such as transformer oil including PCB's, or chemical warfare agents.

We claim:

1. A method of processing material including a volatile component and vitrifiable component using a plasma arc, said vitrifiable component melting when heated to a melting point, said method comprising the steps of:
   melting with the plasma arc a localized surface region on a pool of the vitrifiable component to produce a relatively small localized melted surface region;
   forming a preheated stream of said material at a temperature close to the melting point of said vitrifiable component; and
   introducing said stream of the preheated material directly and completely into the localized melted surface region so that the vitrifiable component of the stream of said preheated material is melted and the volatile component of the stream of said preheated material is volatized, whereby the stream of said preheated material is melted with a minimum supply of thermal energy from the plasma arc;
   wherein the pool of the vitrifiable material is held in a crucible until a portion of the melted vitrifiable component overflows onto a quench roller where the melted vitrifiable component is solidified and reduced to chips.

2. The method as claimed in claim 1, wherein said portion of the melted vitrifiable component overflows through a discharge funnel onto said quench roller.

3. The method as claimed in claim 2, wherein the discharge funnel has a variable rectangular cross section to control the flow of melt onto the quench roller.

4. The method as claimed in claim 2, wherein the funnel discharge spans the length of the quench roller to allow a thin uniform film of melt to form on the entire surface of said quench roller.

5. The method as claimed in claim 2, wherein one wall of the discharge funnel is defined by said crucible and a movable gate that is moved so that the discharge area is varied to control the flow of melt.

6. The method as claimed in claim 1, further comprising the step of scraping the chips from the roller.

7. The method as claimed in claim 1, further comprising the step of dehydrating the stream of said material before the stream of said material is introduced into the pool, and wherein the stream of said material is dehydrated by heating with heat collected from the roller.

8. The method as claimed in claim 7, further comprising the step of scrubbing the effluent of the secondary plasma reactor before removing the undesired components which are returned back to the secondary plasma reactor for further pyrolysis.

9. A method of processing material including a volatile component and vitrifiable component using a plasma arc, said vitrifiable component melting when heated to a melting point, said method comprising the steps of:
   melting with the plasma arc a localized surface region on a pool of the vitrifiable component to produce a relatively small localized melted surface region;
   forming a preheated stream of said material at a temperature close to the melting point of said vitrifiable component;
   introducing said stream of the preheated material directly and completely into the localized melted surface region so that the vitrifiable component of the stream of said preheated material is melted and the volatile component of the stream of said preheated material is volatized, whereby the stream of said preheated material is melted with a minimum supply of thermal energy from the plasma arc; and
   directing the volatilized component from the pool to a secondary plasma reactor, and heating the volatized component in the secondary plasma reactor to very high temperatures so that the volatized component undergoes pyrolysis to produce an effluent.

10. The method as claimed in claim 9, further comprising the steps of removing undesired components form the effluent of the secondary plasma reactor, and returning the undesired components from the effluent back to the secondary plasma reactor for further pyrolysis.

11. A method of processing material including a volatile component and a vitrifiable component, said volatile component including moisture and hydrocarbons, said vitrifiable component melting when heated to a melting point, comprising the steps of:
   (a) dehydrating the material in a dehydrator to remove a substantial portion of the moisture from the material;
   (b) transferring the dehydrated material to a high temperature dryer, and heating the material in the high temperature dryer to remove a substantial portion of the hydrocarbons from the material;
   (c) transferring the material from the high temperature dryer to a preheater, and heating the material in the preheater to a temperature close to said melting point;
   (d) transferring the material from the preheater to a melted pool of the vitrifiable component where the vitrifiable component of the material is melted; and
   (e) directing vitrifiable component to flow from the pool onto a roller where the melted vitrifiable component is solidified and reduced to chips.

12. The method as claimed in claim 11, further comprising the step of scraping the chips from the roller.

13. The method as claimed in claim 11, wherein said dehydrating includes heating the material in the dehydrator, and further comprising the step of transferring heat from the roller to said dehydrator and said high temperature dryer.

14. The method as claimed in claim 11, wherein said dehydrating includes heating the material in the dehydrator, and wherein hydrocarbon fuel is burned to provide heat for heating the material in the dehydrator.

15. The method as claimed in claim 11, further comprising the steps of transferring the hydrocarbons removed from the material to a plasma reactor, and heating the hydrocarbons in the plasma reactor to very high temperatures so that the hydrocarbons undergo pyrolysis to produce an effluent.

16. The method as claimed in claim 15, further comprising the steps of removing undesired components from the effluent of the plasma reactor, and returning the undesired components from the effluent back to the plasma reactor for further pyrolysis.

17. The method as claimed in claim 15, further comprising the step of scrubbing the effluent of the plasma reactor before removing the undesired components which are returned back to the plasma reactor for further pyrolysis.

18. The method as claimed in claim 16, further comprising the step of transferring heat from said effluent of the plasma reactor to said preheater for use in said heating the material to a temperature close to said melting point.

19. A method of processing material including a volatile component and a vitrifiable component, said volatile component including moisture and hydrocarbons, said vitrifiable component melting when heated to a melting point, comprising the steps of:
 (a) dehydrating the material in a dehydrator to remove substantial portion of the moisture from the material, wherein the dehydrating includes heating the material;
 (b) transferring the dehydrated material to a high temperature dryer, and heating the material in the high temperature dryer to remove a substantial portion of the hydrocarbons from the material;
 (c) transferring the material from the high temperature dryer to a melted pool of the vitrifiable component where the vitrifiable component of the material is melted;
 (d) directing the melted vitrifiable component to flow from the pool to a quench chamber where the melted vitrifiable component is cooled and solidified and reduced to chips; and
 (e) transferring heat from the quench chamber to the dehydrator and the high temperature dryer.

20. The method as claimed in claim 19, wherein heat from burning hydrocarbon fuel is also used for heating the material in the dehydrator.

21. The method as claimed in claim 19, wherein the melted vitrifiable component is cooled and solidified on a roller in the quench chamber and the transferred heat is collected from the roller by fluid circulated within the roller.

22. The method as claimed in claim 21, further comprising the step of scraping chips of the solidified vitrifiable component from the roller.

23. The method as claimed in claim 19, further comprising the step of collecting the solidified vitrifiable component in the quench chamber, and continuously removing the solidified vitrifiable component from the quench chamber.

24. The method as claimed in claim 19, further comprising the steps of transferring the hydrocarbons removed from the material to a plasma reactor, and heating the hydrocarbons in the plasma reactor to very high temperatures so that the hydrocarbons undergo pyrolysis to produce an effluent.

25. The method as claimed in claim 24, further comprising the steps of removing undesired components from the effluent of the plasma reactor, and returning the undesired components from the effluent back to the plasma reactor for further pyrolysis.

26. The method as claimed in claim 25, further comprising the step of scrubbing the effluent of the plasma reactor before removing the undesired components which are returned back to the plasma reactor for further pyrolysis.

27. The method as claimed in claim 24, further comprising the step of transferring heat from said effluent of the plasma reactor to said material to pre-heat said material to a temperature close to its melting point when said material is transferred from the high temperature dryer to the pool of the melted vitrifiable component.

* * * * *